US 12,027,918 B2
(12) United States Patent   (10) Patent No.:     US 12,027,918 B2
Tanaka                       (45) Date of Patent:     Jul. 2, 2024

(54) ROTOR AND ELECTRIC MOTOR

(71) Applicant: FUJITSU GENERAL LIMITED, Kanagawa (JP)

(72) Inventor: Hiroaki Tanaka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 218 days.

(21) Appl. No.: 17/765,684

(22) PCT Filed: Jun. 10, 2020

(86) PCT No.: PCT/JP2020/022888
§ 371 (c)(1),
(2) Date: Mar. 31, 2022

(87) PCT Pub. No.: WO2021/084788
PCT Pub. Date: May 6, 2021

(65) Prior Publication Data
US 2022/0344987 A1     Oct. 27, 2022

(30) Foreign Application Priority Data
Oct. 31, 2019   (JP) .................................. 2019-199431

(51) Int. Cl.
*H02K 1/2706*     (2022.01)
(52) U.S. Cl.
CPC .................................. *H02K 1/2706* (2013.01)
(58) Field of Classification Search
CPC ...... H02K 1/2706; H02K 29/03; H02K 1/276; H02K 2201/03; H02K 1/274; H02K 1/28; H02K 2213/03
See application file for complete search history.

(56) References Cited

U.S. PATENT DOCUMENTS

| 2012/0133239 A1* | 5/2012 | Taema | H02K 15/16 29/598 |
| 2013/0113325 A1 | 5/2013 | Saito et al. | |
| 2017/0126080 A1* | 5/2017 | Hasegawa | H02K 1/2706 |

FOREIGN PATENT DOCUMENTS

| CN | 102355071 A | 2/2012 |
| CN | 102986116 A | 3/2013 |
| (Continued) | | |

OTHER PUBLICATIONS

Jan. 4, 2024, Chinese Office Action issued for related CN Application No. 202080072842.1.

*Primary Examiner* — Christopher M Koehler
*Assistant Examiner* — Riley Owen Stout
(74) *Attorney, Agent, or Firm* — Paratus Law Group, PLLC

(57) ABSTRACT

A rotor core of a rotor includes a salient pole portion; air gap portions that extend from the permanent magnet to an outer peripheral surface of the rotor core; notch grooves formed such that the outer peripheral surface of the rotor core is notched; and a bridge portion that is formed between the outer peripheral surface and the air gap portions. The notch grooves are disposed such that the bridge portion is sandwiched between the notch grooves and the air gap portion, and, a notch minimum outside diameter portion in which a distance from the rotation center of the rotor core is the minimum is formed on a plane perpendicular to a rotation axis. The notch minimum outside diameter portion is located at a position closer to a center side of the salient pole portion than the air gap portions in the circumferential direction of the rotor.

7 Claims, 11 Drawing Sheets

(56) References Cited

FOREIGN PATENT DOCUMENTS

| | | |
|---|---|---|
| CN | 106787324 A | 5/2017 |
| CN | 208423969 U | 1/2019 |
| JP | 2012-085532 A | 4/2012 |
| JP | 2012-120326 A | 6/2012 |
| JP | 2015-019485 A | 1/2015 |
| WO | WO 2018/235145 A1 | 12/2018 |

* cited by examiner

ROTOR AND ELECTRIC MOTOR

CROSS REFERENCE TO PRIOR APPLICATION

This application is a National Stage Patent Application of PCT International Patent Application No. PCT/JP2020/022888 (filed on Jun. 10, 2020) under 35 U.S.C. § 371, which claims priority to Japanese Patent Application No. 2019-199431 (filed on Oct. 31, 2019), which are all hereby incorporated by reference in their entirety.

FIELD

The present invention relates to a rotor and an electric motor.

BACKGROUND

There is a known rotor, as a rotor of an electric motor, that includes a rotor core, and a stator core that is disposed on an outer peripheral side of the rotor core in which a plurality of permanent magnets are embedded. In the rotor core with this type of rotor, a plurality of magnet embedding holes in each of which a permanent magnet, which is formed in a plate shape, is disposed in a circumferential direction of the rotor core at intervals. Some rotor core includes an air gap portion (nonmagnetic portion) that extends from both ends of the magnet embedding hole located in the circumferential direction of the rotor core, toward the outer peripheral surface of the rotor core, and a bridge portion that is formed between the outer peripheral surface and the air gap portion.

Furthermore, some rotor core includes a salient pole portion that is formed on the outer side of the magnet embedding hole in the radial direction of the rotor core, and a notch groove that is formed by notching the outer peripheral surface of the rotor core. As a result of forming the notch groove in this way, a magnetic flux distribution in the rotor core is adjusted.

CITATION LIST

Patent Literature

Patent Literature 1: Japanese Laid-open Patent Publication No. 2012-85532
Patent Literature 2: Japanese Laid-open Patent Publication No. 2012-120326

SUMMARY

Technical Problem

The rotor described in the prior art literature is formed such that the length in the radial direction of the air gap portion is longer than the length in the circumferential direction of the air gap portion, and the permanent magnet is disposed away from the outer peripheral surface of the rotor core. In contrast, for example, if the permanent magnet is disposed closer to the outer peripheral surface of the rotor core, magnetic reluctance from the rotor core to the stator core is reduced, and it is thus possible to increase a rotation torque by increasing an amount of magnetic flux flowing from the rotor core to the stator core. Furthermore, it is possible to increase the rotation torque by increasing an amount of magnetic flux flowing from the rotor core to the stator core by using a permanent magnet having a high magnetic flux density without allowing the permanent magnet to approach the outer peripheral surface of the rotor core. In contrast, if an amount of magnetic flux flowing from the rotor core to the stator core is increased, an attracting force generated between the rotor core and the stator core is increased, and thus, there is a problem in that an amount of variation in torque (torque ripple) at the time of rotation of the rotor core is increased.

Accordingly, the disclosed technology has been conceived in light of the circumstances described above, and an object thereof is to provide a rotor and an electric motor capable of suppressing a variation in torque.

Solution to Problem

According to an aspect of an embodiments in the present application, a rotor includes: a rotor core that is formed in a cylindrical shape, wherein the rotor core includes a plurality of magnet embedding holes that are disposed at intervals in a circumferential direction of the rotor core and in each of which a permanent magnet, which is formed in a plate shape, is embedded, a salient pole portion that is formed on an outer side of the permanent magnet in a radial direction of the rotor core, an air gap portion that extends from both end sides of the permanent magnet in the circumferential direction toward an outer peripheral surface of the rotor core, a notch groove that is formed such that a part of the outer peripheral surface is notched, and a bridge portion that is formed between the outer peripheral surface and the air gap portion, the notch groove is disposed such that the bridge portion is sandwiched between the notch groove and the air gap portion, and, as a result of a distance from a rotation center of the rotor core to the notch groove being changed along the circumferential direction on a plane perpendicular to a rotation axis of the rotor core, a notch minimum outside diameter portion, in which the distance from the rotation center is the minimum, is formed at the notch groove, and the notch minimum outside diameter portion is located at a position closer to a center side of the salient pole portion than the air gap portion in the circumferential direction.

Advantageous Effects of Invention

According to an aspect of the rotor disclosed in the present invention, it is possible to suppress a variation in torque.

BRIEF DESCRIPTION OF DRAWINGS

FIG. 4-1 is an enlarged view of the main part of the rotor core according to the embodiment.
FIG. 4-2 is an enlarged view of the main part of the rotor core according to the embodiment.
FIG. 5-1B is an enlarged view illustrating a change in the magnetic flux density distribution in the rotor used in a comparative example, in comparison to the change illustrated in FIG. 5-1A.

FIG. 5-2A is an enlarged view illustrating a change in the magnetic flux density distribution in the rotor according to the embodiment.

FIG. 5-2B is an enlarged view illustrating a change in the magnetic flux density distribution in the rotor used in the comparative example, in comparison to the change illustrated in FIG. 5-2A.

FIG. 5-3A is an enlarged view illustrating a change in the magnetic flux density distribution in the rotor according to the embodiment.

FIG. 5-3B is an enlarged view illustrating a change in the magnetic flux density distribution in the rotor used in the comparative example, in comparison to the change illustrated in FIG. 5-3A.

FIG. 5-4A is an enlarged view illustrating a change in the magnetic flux density distribution in the rotor according to the embodiment.

FIG. 5-4B illustrating a change in the magnetic flux density distribution in the rotor used in the comparative example, in comparison to the change illustrated in FIG. 5-4A.

DESCRIPTION OF EMBODIMENTS

Preferred embodiments of a rotor and an electric motor disclosed in the present invention will be described in detail below with reference to the accompanying drawings. Furthermore, the rotor and the electric motor disclosed in the present invention is not limited by the embodiments described below.

Embodiment

Configuration of Electric Motor

Figure 1:
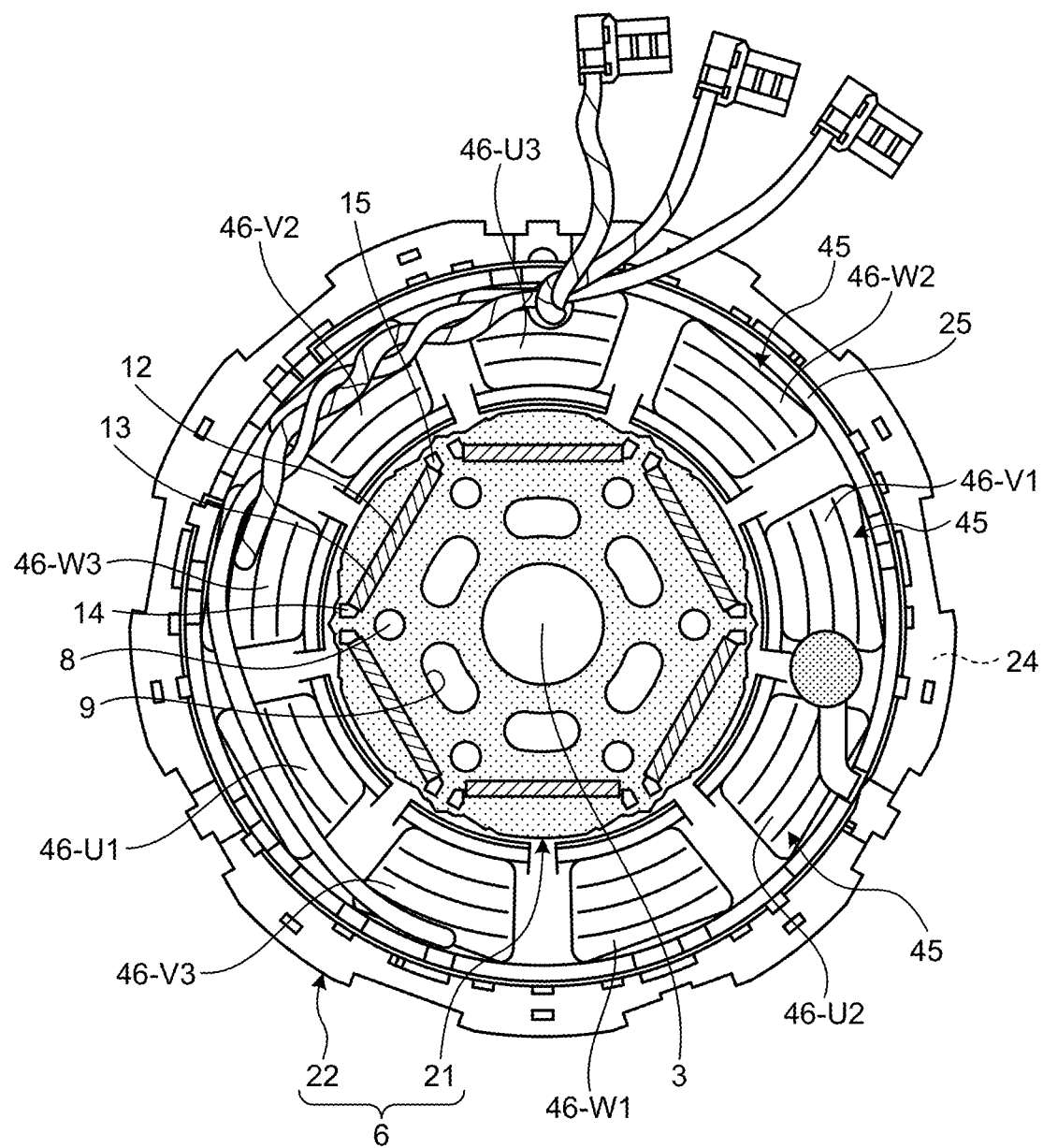
FIG. 1 is a plan view illustrating an electric motor according to an embodiment.
Figure 2:
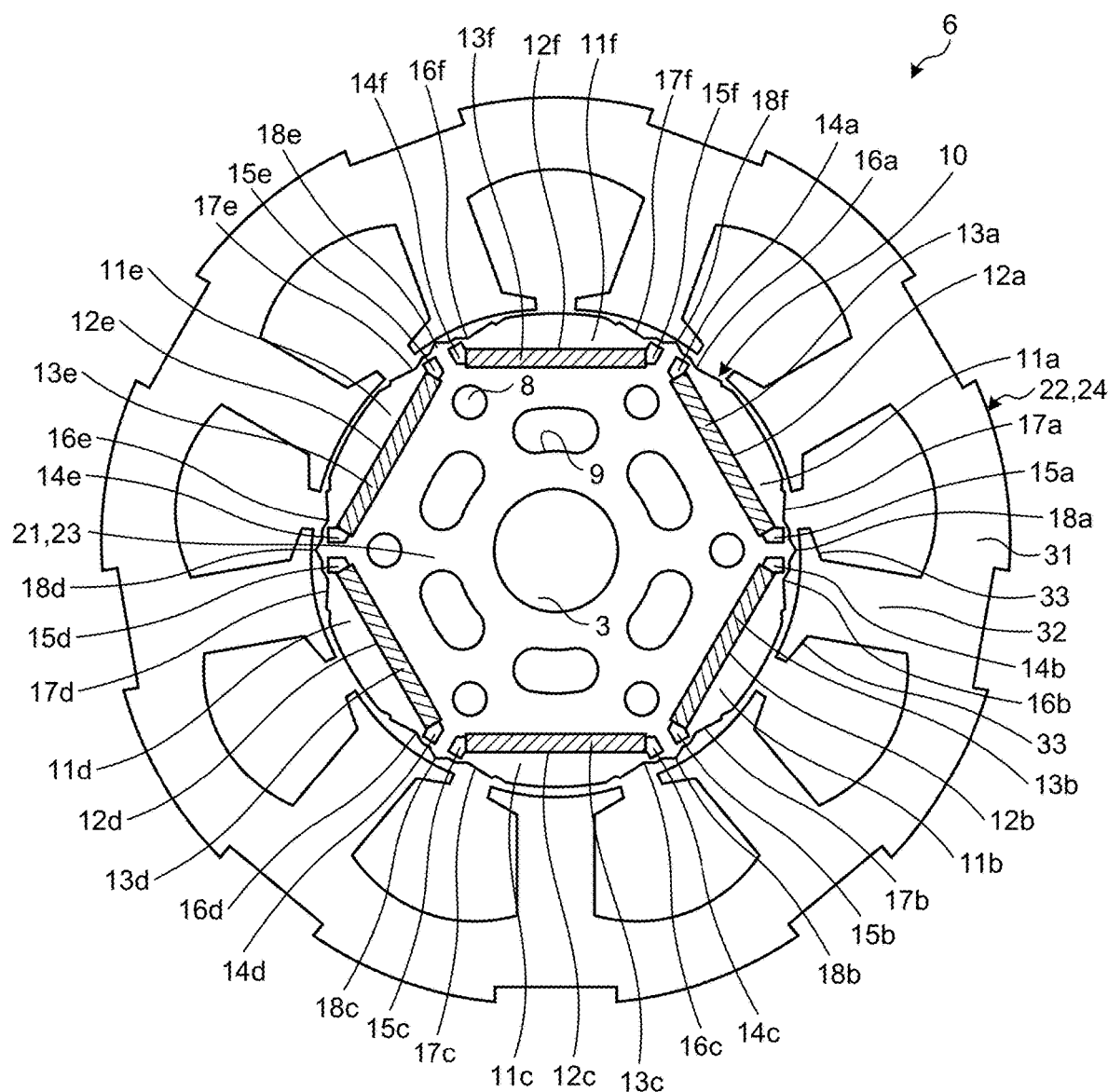
FIG. 2 is a plan view illustrating a rotor according to the embodiment.

FIG. 1 is a plan view illustrating an electric motor according to an embodiment. FIG. 2 is a plan view illustrating a rotor according to the embodiment. As illustrated in FIG. 1 and FIG. 2, an electric motor 6 according to the embodiment is a three-phase motor with a concentrated winding type having six poles and nine slots. The electric motor 6 includes a rotor 21 as a rotor, and a stator 22 as a stator that is disposed on an outer peripheral side of the rotor 21. The rotor 21 includes a rotor core 23 that is formed in a cylindrical by laminating a plurality of metal plates, which are made of a soft magnetic material, such as a silicon steel plate, and the plurality of the metal plates and that are integrally formed by, for example, caulking. A shaft 3 serving as a rotation axis is inserted into the central axis of the rotor core 23, and the shaft 3 and the rotor 21 are fixed with each other. Furthermore, a plurality of refrigerant gas passages 9 are provided in the rotor core 23 so as to passing through the axial direction of the rotor core 23 (in the axial direction of the shaft 3), and the plurality of refrigerant gas passages 9 are disposed at intervals along the axis of the shaft 3. The main part of the rotor core 23 according to the embodiment, will be described later.

The stator 22 is formed in a substantially columnar shape and is disposed so as to surround the outer peripheral side of the rotor 21. The stator 22 is fixed to an inner part of a compression container of, for example, a compressor (not illustrated). As illustrated in FIG. 1, the stator 22 includes a stator core 24, an upper insulator 25, a lower insulator (not illustrated), and a plurality of winding wires 46. The stator core 24 is disposed at a predetermined air gap on the outer peripheral surface of the rotor core 23. In the stator core 24, nine pieces of teeth 32 portions, which extend from a yoke 31 that has a ring shape, are formed inwardly at an interval of 40 deg (machine angle) in the circumferential direction of the stator core 24, and a leading end edge 33 is formed so as to protrude from the leading end of the teeth 32 in the circumferential direction of the stator core 24. A winding portion 45 is formed at each of the teeth 32 portions by the respective winding wires 46. The plurality of winding wires 46 include three U-phase winding wires 46-U1 to 46-U3, three V-phase winding wires 46-V1 to 46-V3, and three W-phase winding wires 46-W1 to 46-W3. Furthermore, in the stator 22, a neutral wire, which is pulled out from each of the winding portions 45 and bundled, is covered by an insulating tube, and is inserted in the gap formed between the corresponding winding portions 45 that are adjacent in the circumferential direction of the stator 22 (in the direction of rotation of the rotor 21) (see FIG. 1). The upper insulator 25 is fixed to the upper end portion of the stator core 24. A lower insulator is fixed to the lower end portion of the stator core 24. The upper insulator 25 and the lower insulator are insulating members that insulate the stator core 24 and the winding wires 46.

As illustrated in FIG. 2, the rotor core 23 included in the electric motor 6 according to the embodiment includes a plurality of magnet embedding holes 12a, 12b, 12c, 12d, 12e, and 12f (hereinafter, referred to as a magnet embedding hole 12) in which permanent magnets 13a, 13b, 13c, 13d, 13e, and 13f (hereinafter, referred to as a permanent magnet 13) are embedded. In the rotor core 23, six slit-shaped magnet embedding holes 12 are formed to constitute the six sides of a hexagon around the shaft 3. Each of the magnet embedding holes 12 is formed at a predetermined interval in the circumferential direction of the rotor core 23. The plate-shaped permanent magnets 13 are embedded in the respective magnet embedding holes 12. Furthermore, an end plate for preventing the permanent magnet 13 from falling off, is attached to both end surfaces in the axial direction of the rotor core 23; however, the end plate is not illustrated in order to explain the main part of the rotor core 23. The end plate is fixed to the rotor core 23 by a rivet 8.

Figure 3:
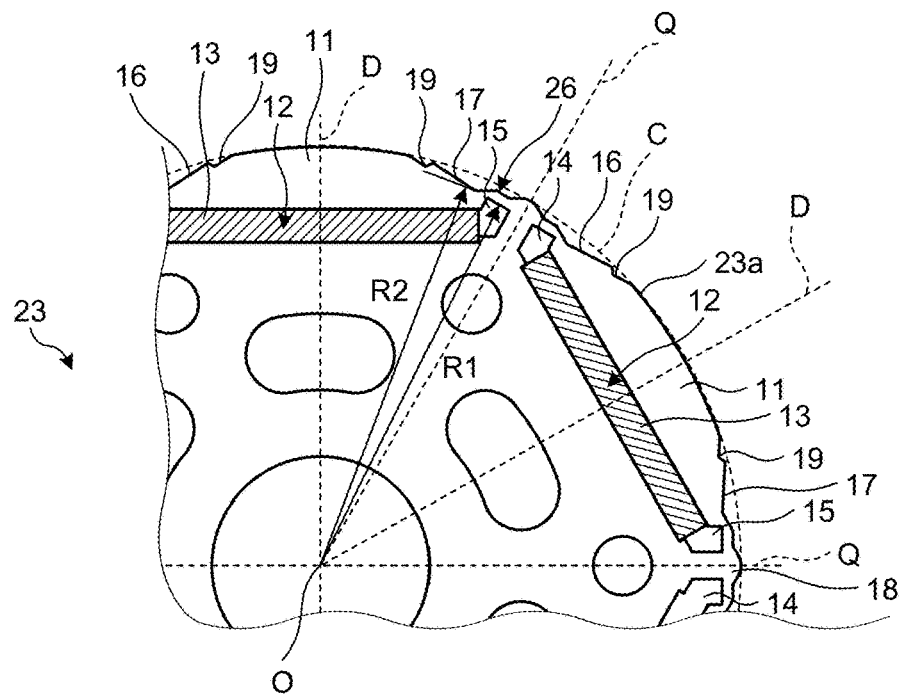
FIG. 3 is a plan view illustrating the main part of a rotor core included in the rotor according to the embodiment.

FIG. 3 is a plan view illustrating the main part of the rotor core 23 included in the rotor according to the embodiment. Furthermore, as illustrated in FIG. 2, the rotor core 23 includes a plurality of salient pole portions 11a to 11f (hereinafter, referred to as a salient pole portion 11), a plurality of air gap portions 14a to 14f and 15a to 15f (hereinafter, referred to as air gap portions 14 and 15), a plurality of notch grooves 16a to 16f and 17a to 17f (hereinafter, referred to as notch grooves 16 and 17), and a plurality of bridge portions 26.

The salient pole portion 11 is formed on the outer side of the permanent magnet 13 in the radial direction of the rotor core 23. On the both end sides of the permanent magnet 13 in the circumferential direction of the rotor core 23, the air gap portions 14 and 15, which are nonmagnetic portions (flux barriers), are consecutively formed in the magnet embedding hole 12, short circuit of a magnetic flux is prevented by the air gap portion 14. In other words, a through-hole passing in the axial direction is formed in the rotor core 23, and, an area, which is embedded by the permanent magnet 13 in the through-hole, is the magnet embedding hole 12, whereas an area, which is not embedded by the permanent magnet 13 in the through-hole, is the air gap portions 14 and 15 serving as the nonmagnetic portions. The air gap portions 14 and 15 are formed so as to extend from the both end sides of the permanent magnet 13 in the circumferential direction of the rotor core 23 toward the outer side in the radial direction of the rotor core 23, that is, toward an outer peripheral surface 23a of the rotor core 23. In the circumferential direction of the rotor core 23, the air gap portion 14 is formed on the one end side of the salient pole portion 11, whereas the air gap portion 15 is formed on the other end side of the salient pole portion 11.

The notch grooves 16 and 17 are formed such that a part of the outer peripheral surface 23a of the rotor core 23, which has a cylindrical shape, is notched toward an inner side in the radial direction of the rotor core 23. Here, on the plane perpendicular to the axial direction of the rotor core 23, in the case where a circle, which is circumscribed on the outer peripheral surface 23a of the rotor core 23, is denoted by virtual circle C, the notch grooves 16 and 17 are formed so as to become hollow from the virtual circle C toward the inner side in the radial direction, and disposed in the vicinity of the air gap portions 14 and 15 included in the rotor core 23. In the circumferential direction of the rotor core 23, the notch groove 16 is formed on one end side of each of the salient pole portions 11, and the notch groove 17 is formed on the other end side of each of the salient pole portions 11. The notch grooves 16 and 17 will be described in detail later.

Furthermore, on the outer peripheral surface 23a of the rotor core 23, each of projection portions 18, which projects to the outer side in the radial direction of the rotor core 23, is formed between the notch grooves 17a and 16b, 17b and 16c, 17c and 16d, 17d and 16e, 17e and 16f, and 17f and 16a. Each of the projection portions 18 is disposed on a q-axis Q that extends from a rotation center O of the rotor core 23 passing through the center between the adjacent permanent magnets 13. In other words, in the electrode spacing portion between the air gap portion 14 and the air gap portion 15 that are adjacent with each other in the rotor core 23, the part, which is not notched from the virtual circle C toward the inner side in the radial direction of the rotor core 23, corresponds to each of the projection portions 18. On the plane perpendicular to the axial direction of the shaft 3, the leading end of each of the projection portions 18 is formed in an arc shape. Furthermore, the rotation center O of the rotor core 23 matches the rotation center of the rotor 21.

Furthermore, on the outer peripheral surface 23a of the rotor core 23, a small groove 19 is formed so as to be adjacent to one end on the center side of the salient pole portion 11, which is included in the notch grooves 16 and 17, that is, one end on a d-axis D side that extends from the rotation center O of the rotor core 23 passing through the center of the permanent magnet 13. The bridge portion 26 is formed between the outer peripheral surface 23a and the air gap portion 14 included in the rotor core 23, and is formed between the outer peripheral surface 23a and the air gap portion 15. The bridge portion 26 will be described in detail later.

As described above, as a result of the notch grooves 16 and 17, the projection portions 18, and the grooves 19 being formed on the outer peripheral surface 23a of the rotor core 23, a harmonic component of an inductive voltage generated by the permanent magnet 13 is reduced, and it is possible to reduce a cogging torque by allowing the inductive voltage waveform to approach a sine wave. In the rotor core 23, the air gap portions 14 and 15, the notch grooves 16 and 17, the projection portions 18, and the grooves 19 are formed in a line symmetry manner with respect to the d-axis D of the respective salient pole portions 11.

Characteristic Configuration of Rotor Core

Figures 1, 4:
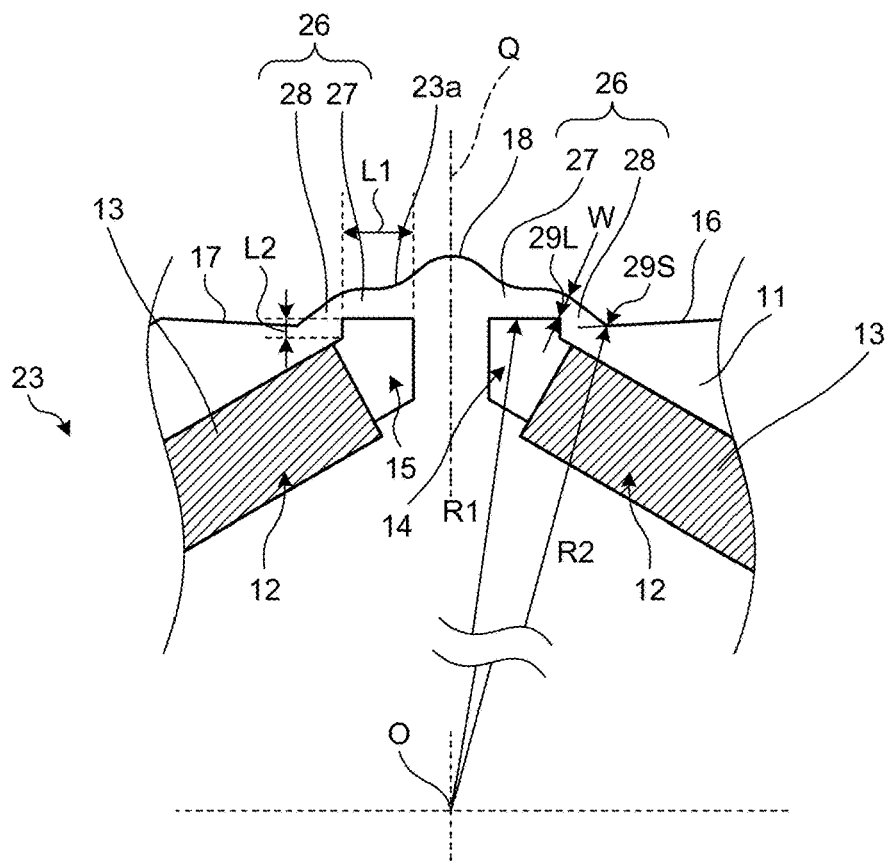
Figures 2, 4:
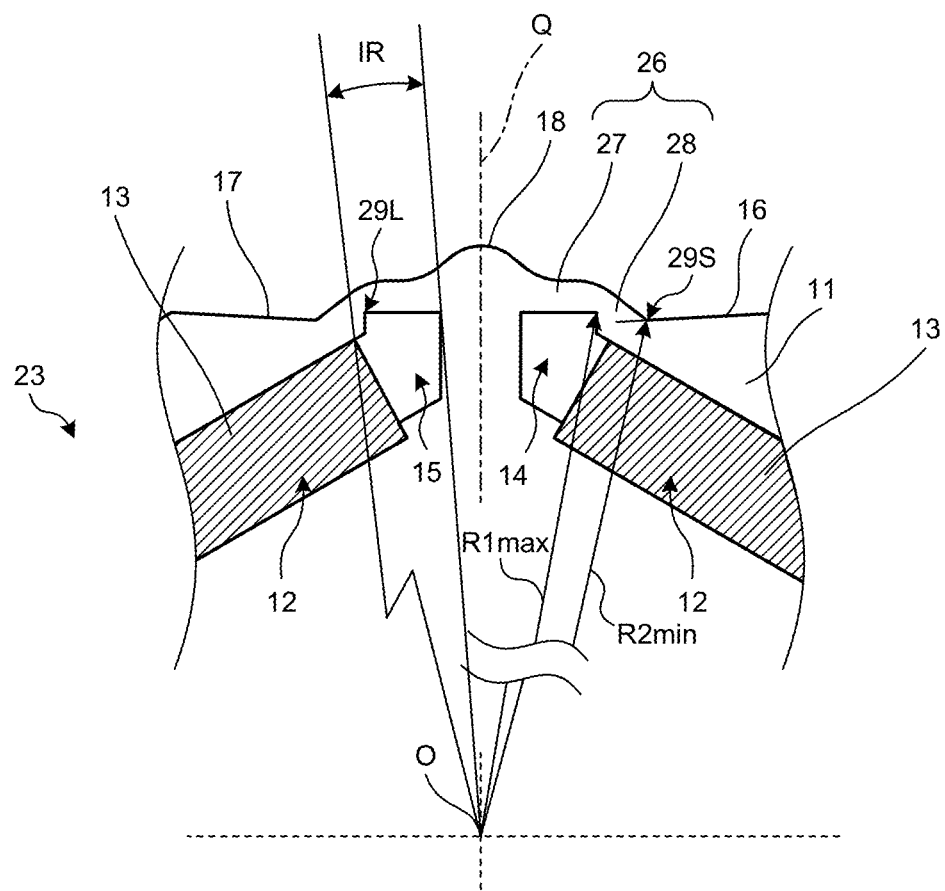

In the following, a characteristic configuration of the rotor core 23 according to the embodiment, will be described. FIGS. 4-1 and 4-2 are enlarged views each illustrating the main part of the rotor core 23 according to the embodiment. The characteristic of the embodiment includes a position of the notch grooves 16 and 17 included in the rotor core 23, the shape of the bridge portions 26, or the like.

As illustrated in FIG. 3, FIG. 4-1, and FIG. 4-2, on the outer peripheral surface 23a of the rotor core 23, the notch groove 16 is disposed such that the bridge portion 26 is sandwiched between the notch groove 16 and the air gap portion 14, and the notch groove 17 is disposed such that the bridge portion 26 is sandwiched between the notch groove 17 and the air gap portion 15. Furthermore, on the plane perpendicular to the axial direction of the shaft 3, in each of the notch grooves 16 and 17, a notch minimum outside diameter portion 29S, in which a distance R2 is the minimum, is formed as a result of the distance R2 (the outside diameter of the rotor core 23) from the rotation center O of the rotor core 23 being changed along the circumferential direction of the rotor core 23. In other words, in each of the notch grooves 16 and 17, the notch minimum outside diameter portion 29S, in which the depth of the notch is the maximum, is formed as a result of the depth of the depression from the virtual circle C circumscribed on the outer peripheral surface 23a of the rotor core 23 to the inner side in the radial direction of the rotor core 23 being changed along the circumferential direction of the rotor core 23. Here, the distance from the rotation center O to the notch minimum outside diameter portion 29S is denoted by R2min. The notch minimum outside diameter portion 29S is located at a positon closer to the center side (on the d-axis D side) of the salient pole portion 11 in the circumferential direction of the rotor core 23 than the virtual region IR (an area between two straight lines that extend from the rotation center O in the radial direction of the rotor core 23 and that pass through both ends of each of the air gap portions 14 and 15 in the circumferential direction) obtained by projecting each of the air gap portions 14 and 15 toward an outer side in the radial direction of the rotor core 23. By using the notch grooves 16 and 17 structured in this way, it is possible to suppress an amount of variation in torque (hereinafter, referred to as a torque ripple) at the time of rotation of the rotor core 23.

Each of the air gap portions 14 and 15 is formed so as to be L1>L2, where L1 denotes a length in the circumferential direction that extends in the circumferential direction of the rotor core 23, and L2 denotes a length in the radial direction that extends from the end portion, which is located on the outside diameter side of the permanent magnet 13, as a starting point toward an outer side in the radial direction (in the direction of q-axis Q) of the rotor core 23. As a result, the length in the radial direction L2 of each of the air gap portions 14 and 15, is shorter than the length in the circumferential direction L1, so that it is possible to dispose the permanent magnet 13 at the position closer to the outer peripheral surface 23a, and it is thus possible to increase the rotation torque of the rotor 21 by increasing an amount of magnetic flux flowing from the rotor core 23 to the stator core 24. Furthermore, on the plane perpendicular to the shaft 3, each of the air gap portions 14 and 15 includes an air gap maximum outside diameter portion 29L, in which a distance R1 from the rotation center O of the rotor core 23 is the maximum in the inner surfaces of each of the air gap portions 14 and 15. In addition, if the distance from the rotation center O of the rotor core 23 to the air gap maximum outside diameter portion 29L, is denoted by R1max, the relationship with the distance R2min from the rotation center O to the notch minimum outside diameter portion 29S satisfies the relational expression indicated by Equation 1 below:

$$R1max \geq R2min \tag{1}$$

Although a description in detail will be described later, as a result of Equation (1) being satisfied, it is possible to suppress a reduction in efficiency (combined efficiency) of the electric motor 6, and it is possible to further suppress a torque ripple at the time of rotation of the rotor core 23 (see FIG. 9).

As illustrated in FIG. 4-1 and FIG. 4-2, in the rotor core 23, the bridge portion 26, which has a long slender shape, is formed between the outer peripheral surface 23a and the air gap portions 14 and 15. The bridge portion 26 includes a first bridge 27, which extends along the circumferential direction of the rotor core 23, and a second bridge 28, which is provided so as to be inclined from one end on the center side (on the d-axis D side) of the salient pole portion 11 in the first bridge 27 toward the inner side in the radial direction of the rotor core 23. The first bridge 27 is extended from the q-axis Q side (from the projection portion 18 side) to the d-axis D side so as to be along with the circumferential direction of the rotor core 23, and is coupled to the second bridge 28.

In the longitudinal direction in which the bridge portion 26 extends, a width W (the distance between the outer peripheral surface 23a and the air gap portion 14 or 15) of the bridge portion 26 becomes the minimum at the position of the air gap maximum outside diameter portion 29L. Each of the notch grooves 16 and 17 is formed such that the width W of the bridge portion 26 is the minimum at the position (a position in which the second bridge 28 is inclined from the first bridge 27) in the vicinity of the boundary between, for example, the first bridge 27 and the second bridge 28. Furthermore, the position at which the width W of the bridge portion 26 becomes the minimum may be located on the salient pole portion 11 side of the second bridge 28 in accordance with the shape and the disposition of the air gap portions 14 and 15 or the notch grooves 16 and 17. In the present embodiment, the width W of the first bridge 27 is formed so as to be 0.4 (mm), and the width W of the bridge portion 26 at the position (the air gap maximum outside diameter portion 29L) of the boundary between the first bridge 27 and the second bridge 28, is formed to be 0.36 (mm).

Furthermore, as described above, in the bridge portion 26, if a length in the circumferential direction of the first bridge 27 (corresponding to the length of each of the air gap portions 14 and 15 extending in the circumferential direction of the rotor core 23) is denoted by L1, and a length in the radial direction of the second bridge 28 (corresponding to the length of each of the air gap portions 14 and 15 extending from the end portion, which is located on the outside diameter side of the permanent magnet 13, as a starting point toward an outer side in the radial direction (in the direction of q-axis Q) of the rotor core 23 is denoted by L2, the following relationship is satisfied.

$$L1 > L2 \tag{2}$$

Although a description in detail will be described later, as a result of Equation (2) being satisfied, any further magnetic flux does not flow in the bridge portion 26 by causing magnetic saturation to be generated in the second bridge 28. As a result, the leakage magnetic flux via the bridge portion 26 is suppressed (see FIG. 5), and it is possible to suppress a torque ripple at the time of rotation of the rotor core 23 while suppressing a reduction in efficiency (combined efficiency) of the electric motor 6 (see FIG. 9).

Figures 1A, 5:
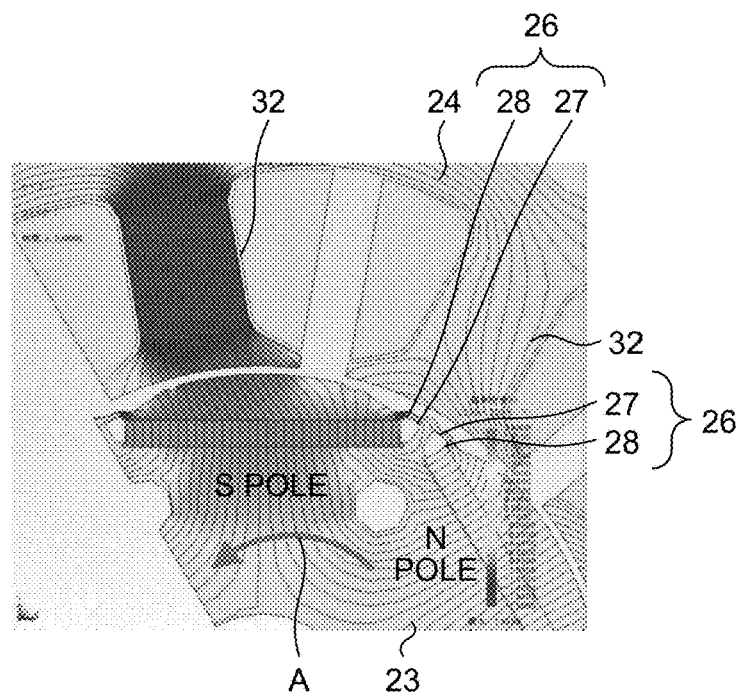
FIG. 5-1A is an enlarged view illustrating a change in the magnetic flux density distribution in the rotor according to the embodiment.
Figures 1B, 5:
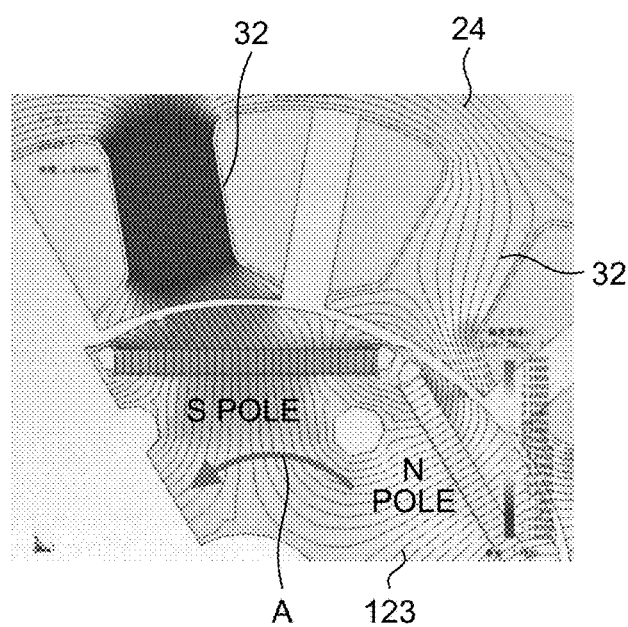
Figures 2A, 5:
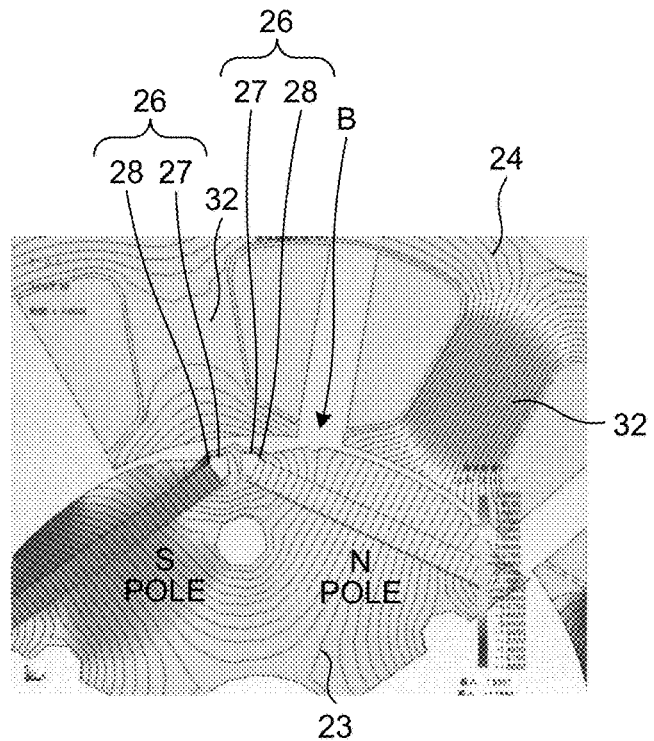
Figures 2B, 5:
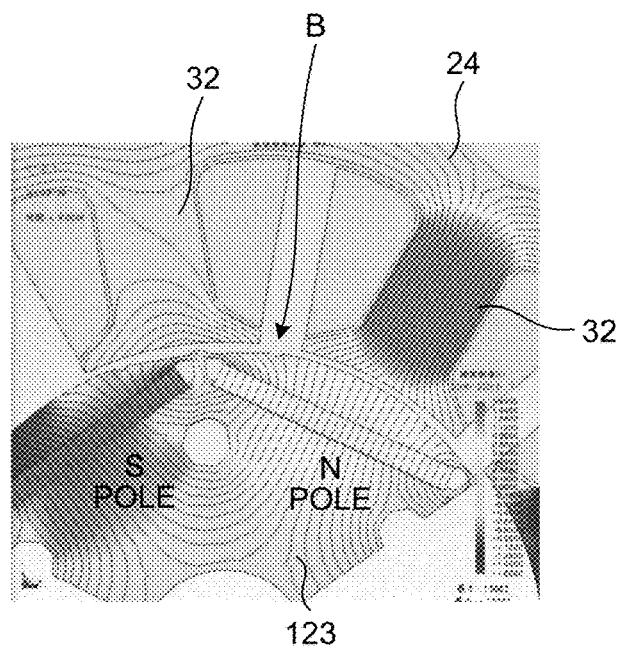
Figures 3A, 5:
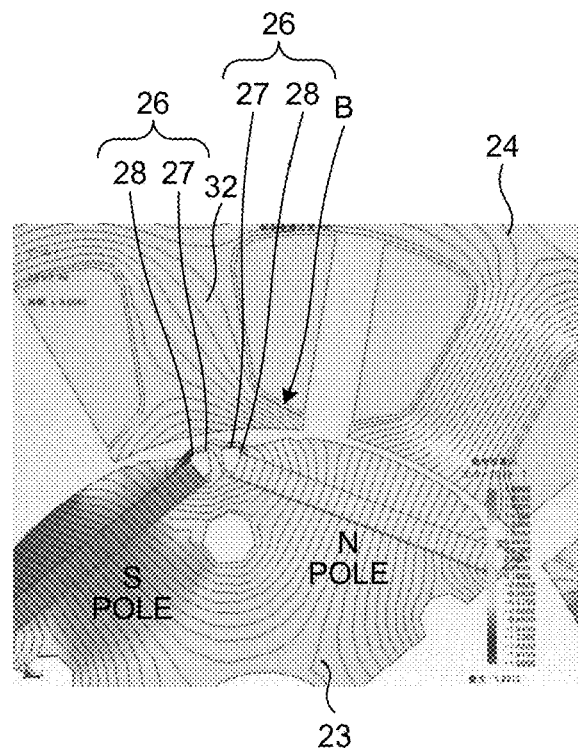
Figures 3B, 5:
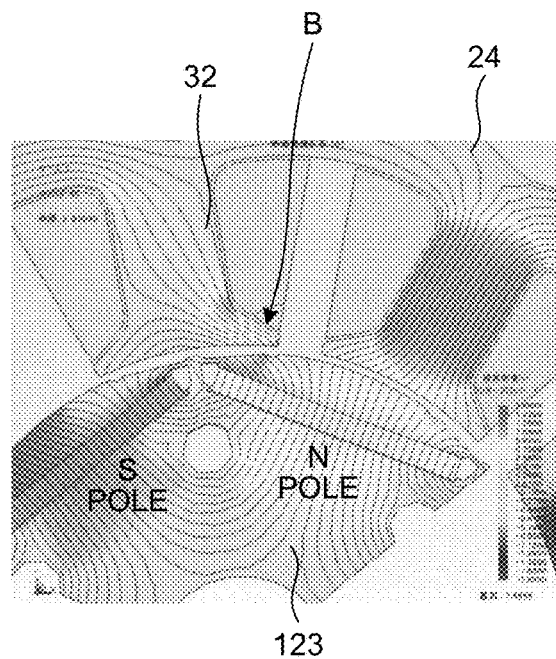
Figures 4A, 5:
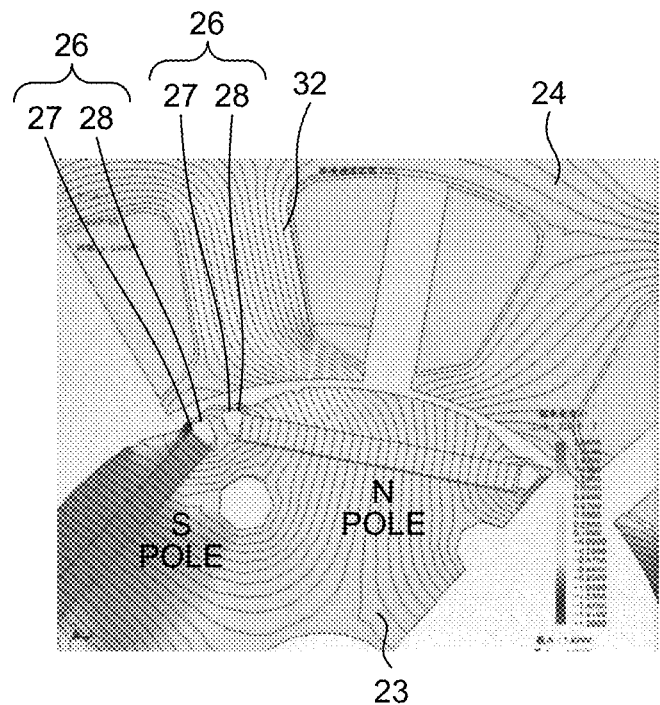
Figures 4B, 5:
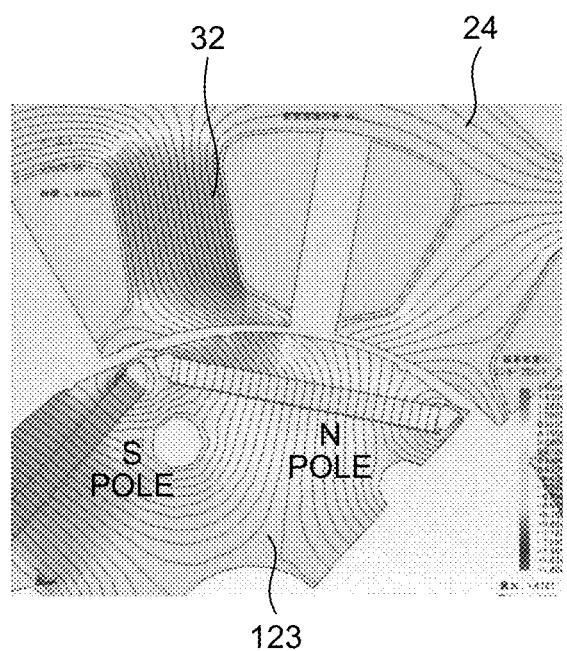

FIG. 5-1A to FIG. 5-4A are enlarged views each illustrating a change in the magnetic flux density distribution in the rotor 21 according to the embodiment. FIG. 5-1B to FIG. 5-4B are enlarged views each illustrating a change in the magnetic flux density distribution in the rotor used in the comparative example, as compared to FIG. 5-1A to FIG. 5-4A, respectively. Each of a set of FIG. 5-1A and FIG. 5-1B, a set of FIG. 5-2A and FIG. 5-2B, a set of FIG. 5-3A and FIG. 5-3B, and a set of FIG. 5-4A and FIG. 5-4B indicates the state of the rotor core at the same time point. The rotor core rotates in the direction of an arrow A (counterclockwise) in the drawings.

In the comparative examples illustrated in FIG. 5-1B to FIG. 5-4B, by assigning the same reference numerals to the same members and the same portions as those described in the embodiment illustrated in FIG. 5-1A to FIG. 5-4A, and descriptions thereof will be omitted. In the rotor core 23 according to the embodiment, the notch minimum outside diameter portion 29S, in which the distance R2 from the rotation center O of the rotor core 23 to each of the notch grooves 16 and 17 is the minimum, is formed at a position closer to the center side (on the d-axis D side) of the salient pole portion 11 in the circumferential direction of the rotor core 23 than the virtual region IR obtained by projecting each of the air gap portions 14 and 15 toward the outer side in the radial direction of the rotor core 23. In contrast, a rotor core 123 used in the comparative example is different from the rotor core 23 according to the embodiment in that the notch minimum outside diameter portion 29S is formed in the virtual region IR. The other configuration except for the rotor cores 23 and 123 are the same as those used in the embodiment and the comparative example.

The rotor core 23 according to the embodiment illustrated in FIG. 5-1A, as compared to the rotor core 123 used in the comparative example illustrated in FIG. 5-1B, when the permanent magnet 13 of the N pole approaches the teeth 32 in the stator core 24, the magnetic flux, which enters from the permanent magnet 13 of the N pole toward the teeth 32, is suppressed. As illustrated in FIG. 5-2B, in the rotor core 123 used in the comparative example, when the permanent magnet 13 of the N pole further approaches the teeth 32 in the stator core 24, the magnetic flux density of the teeth 32 is increased. Furthermore, as illustrated in FIG. 5-2B and FIG. 5-3B, the rotor core 123 used in the comparative example, an amount of magnetic flux, which comes into the teeth 32 from the one end side of the salient pole portion 11 entering the position that is opposite the teeth 32 at the position indicated by an arrow B in the drawing, is increased. In other words, in the rotor core 123 used in the comparative example, the notch grooves 16 and 17 having the characteristic described in the embodiment are not formed, so that magnetic flux from the permanent magnet 13 of the N pole is not generated at the time at which the polarity of the permanent magnet 13 of the rotor 21 is changed from the S pole to the N pole at the position indicated by the arrow B in the drawing. In contrast, as illustrated in FIG. 5-2A and FIG. 5-3A, in the rotor core 23 according to the embodiment, when the permanent magnet 13 of the N pole further approaches the teeth 32, as compared to the rotor core 123 used in the comparative example, an increase in the magnetic flux density of the teeth 32 is suppressed, and also, at the position indicated by the arrow B in the drawing, the magnetic flux, which comes into the teeth 32 from the one end side of the salient pole portion 11 entering the position that is opposite the teeth 32, is suppressed.

As illustrated in FIG. 5-3B and FIG. 5-4B, in the rotor core 123 used in the comparative example, as a result of an increase in magnetic flux coming into the teeth 32 from the one end of the salient pole portion 11 at the position indicated by the arrow B in the drawing, the magnetic flux density of the teeth 32 is increased as the salient pole portion 11 approaches the teeth 32. In contrast, as illustrated in FIG. 5-3A and FIG. 5-4A, in the rotor core 23 according to the embodiment, as compared to the rotor core 123 used in the comparative example, an increase in magnetic flux density of the teeth 32 at the time at which the salient pole portion 11 approaches the teeth 32, is suppressed. As described above, as a result of the rotor core 23 according to the embodiment including the notch grooves 16 and 17, the air gap between the rotor core 23 and the stator core 24, is appropriately secured, so that, as compared to the rotor core 123 used in the comparative example, a variation in magnetic flux density at the time of rotation of the rotor core 23, is suppressed, and thus, a torque ripple is suppressed.

Furthermore, as illustrated in FIG. 5-1A to FIG. 5-4A, regarding the length of the bridge portion 26, the length in the radial direction L2 of the second bridge 28 is shorter than the length in the circumferential direction L1 of the first bridge 27, so that the rotor core 23 according to the embodiment causes a magnetic saturation to be generated in the second bridge 28, and thus, further magnetic flux does not flow in the second bridge 28 that has a width narrower than that of the first bridge 27. Furthermore, the rotor core 23 is formed such that the first bridge 27 is longer than the second bridge 28, and the width W of the bridge portion 26 is the minimum in the vicinity of the boundary between the first bridge 27 and the second bridge 28, so that the leakage magnetic flux, such as a short circuit, flowing to the first bridge 27 via the second bridge 28, is greatly suppressed. As a result, a reduction in efficiency (combined efficiency) of the electric motor 6 including the rotor core 23 according to the embodiment, is suppressed.

Figure 6:
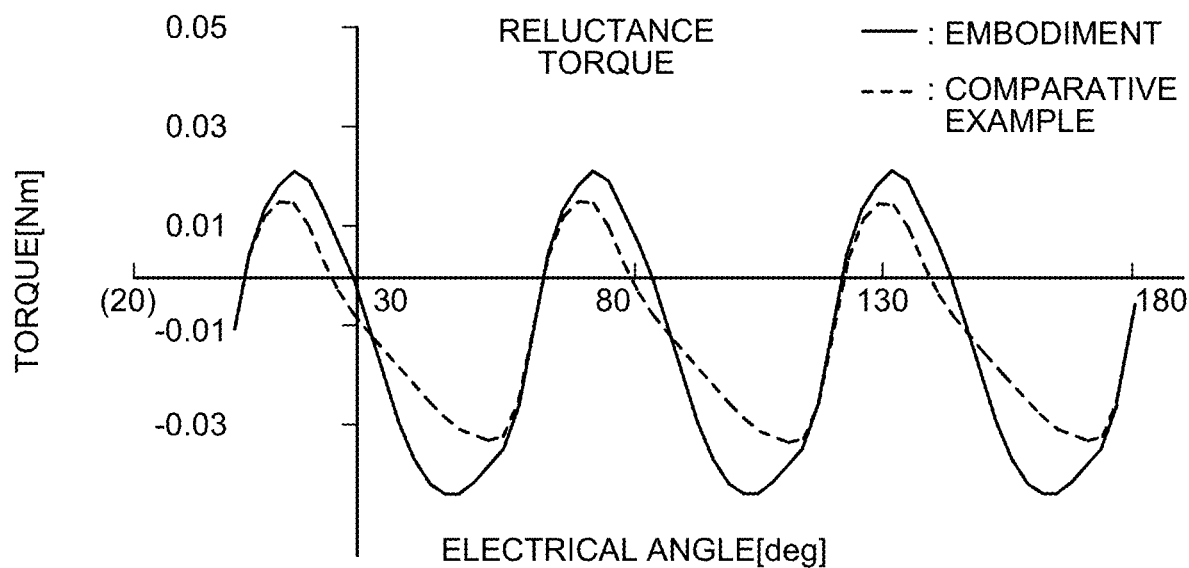
FIG. 6 is a diagram illustrating a reluctance torque by comparing the rotor according to the embodiment to the rotor used in the comparative example.
Figure 7:
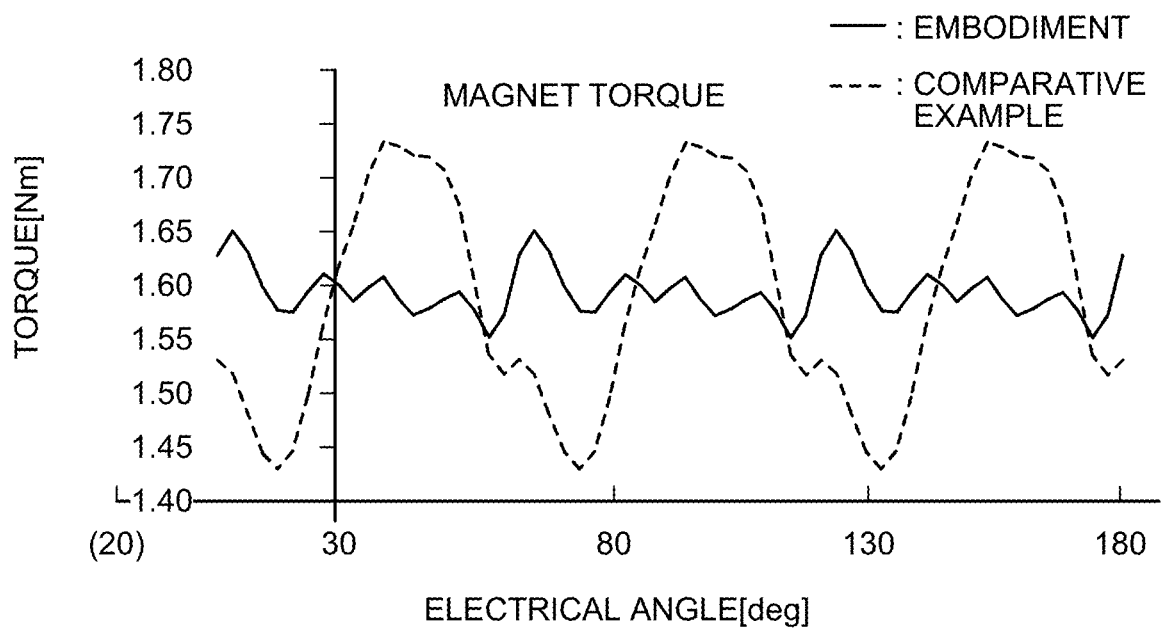
FIG. 7 is a diagram illustrating a magnet torque by comparing the rotor according to the embodiment to the rotor used in the comparative example.

Comparison of Torque Waveform According to Embodiment to that in Comparative Example FIG. 6 is a diagram illustrating a reluctance torque by comparing the rotor according to the embodiment to the rotor used in the comparative example. FIG. 7 is a diagram illustrating a magnet torque by comparing the rotor according to the embodiment to that used in the comparative example. In FIG. 6 and FIG. 7, the rotor core 23 according to the embodiment that includes the notch grooves 16 and 17, is indicated by a solid line, whereas the rotor core 123 used in the comparative example that does not include the notch grooves 16 and 17, is indicated by a broken line. Furthermore, in FIG. 6 and FIG. 7, the vertical axis indicates a torque (Nm), whereas the horizontal axis indicates an electrical angle (deg).

As illustrated in FIG. 6, the reluctance torque of the rotor core 23 according to the embodiment varies in the range of about −0.01±0.03 (Nm) at an electrical angle, whereas the reluctance torque of the rotor core 123 used in the comparative example varies in the range of about −0.01±0.02 (Nm) at an electrical angle. As a result, as compared to the rotor core 123 used in the comparative example, in the rotor core 23 according to the embodiment, the width of an amount of variation in the reluctance torque based on the electrical angle is slightly (about ±0.01 (Nm)) increased. In contrast, as illustrated in FIG. 7, the magnet torque of the rotor core 23 according to the embodiment varies in the range of about 1.60±0.05 (Nm) at an electrical angle, whereas the magnet torque of the rotor core 123 used in the comparative example varies in the range of about 1.60±0.15 (Nm) at the electrical angle. As a result, in the rotor core 23 according to the embodiment, the width of an amount of variation in magnet torque based on the electrical angle, is smaller than that of the rotor core 123 used in the comparative example by an amount about ±0.1 (Nm). As a result, regarding a torque of a motor represented by a combination of the reluctance torque and the magnet torque, for an amount of variation in torque (torque ripple) based on the electrical angle, influence caused by a variation in magnet torque is more dominant than influence caused by a variation in reluctance torque. In the rotor core 23 according to the embodiment, although an amount of variation in reluctance torque is slightly larger than that used in the comparative example, a reduction in the amount of variation in magnet torque in the comparative example, is remarkable. As a result, in the rotor core according to the embodiment, it is possible to sufficiently reduce the torque ripple as compared to that in the rotor core 123 used in the comparative example.

Figure 8A:
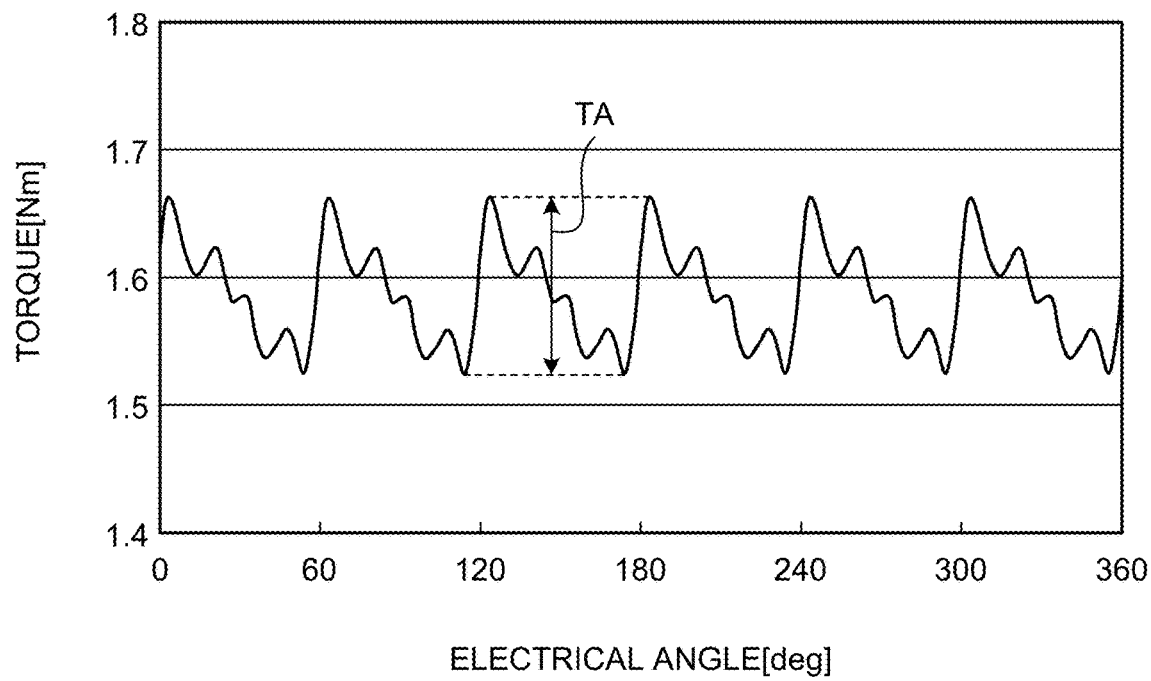
FIG. 8A is a diagram illustrating a torque waveform in the rotor core according to the embodiment.
Figure 8B:
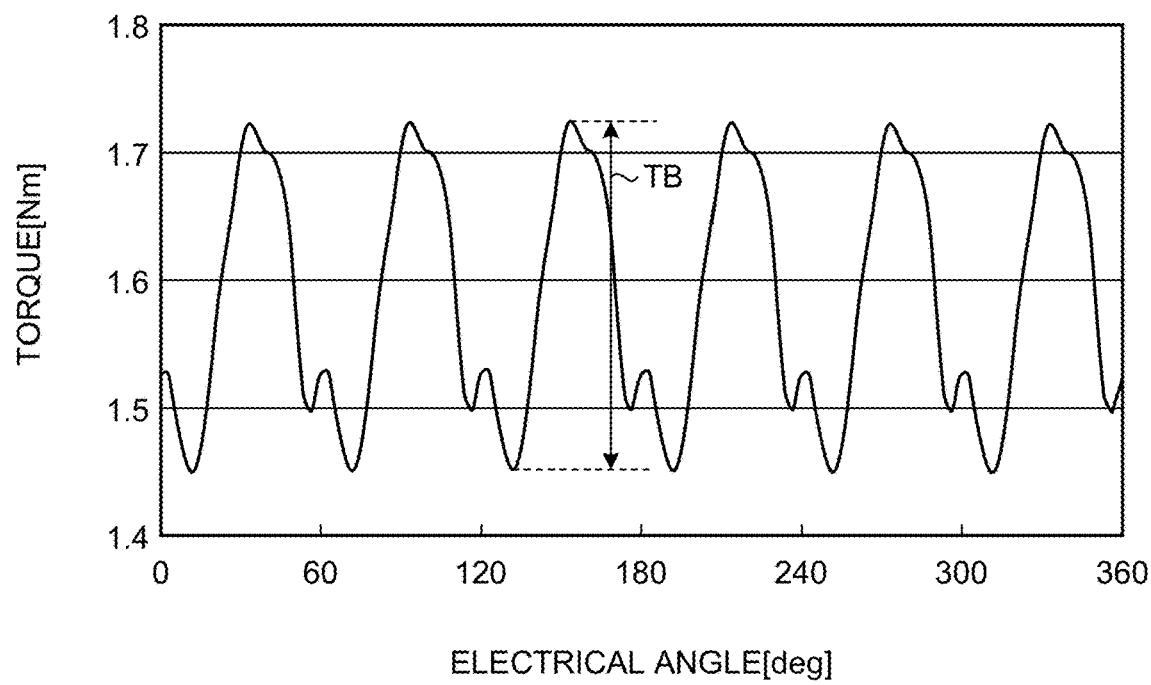
FIG. 8B is a diagram illustrating a torque waveform in the rotor core used in the comparative example.

FIG. 8A is a diagram illustrating a torque waveform in the rotor core 23 according to the embodiment. FIG. 8B is a diagram illustrating a torque waveform in the rotor core 123 used in the comparative example. In FIG. 8A and FIG. 8B, the vertical axis indicates a torque (Nm), whereas the horizontal axis indicates an electrical angle (deg). FIG. 8A and FIG. 8B indicate the torque obtained by combining each of the waveforms illustrated in FIG. 6 and FIG. 7.

As illustrated in FIG. 8B, in the rotor core 123 used in the comparative example, a torque ripple TB corresponding to an amount of variation in torque based on the electrical angle (a difference between the maximum value of the torque and the minimum value of the torque) is 0.27 (Nm). In contrast, as illustrated in FIG. 8A, in the rotor core 23 according to the embodiment, a torque ripple TA is suppressed to 0.14 (Nm).

In general, an Interior Permanent Magnet (IPM) motor with a magnet embedding type, a torque is a combination of a reluctance torque and a magnet torque. As a result, in terms of reducing a torque ripple, it is desirable that the phase of the reluctance torque and the phase of the magnet torque be inverted. In other words, by making a design such that a waveform and an amplitude that indicates a variation of each of the reluctance torque and the magnet torque are the same and the phases of the reluctance torque and the magnet torque are inverted, in theory, a torque ripple can be zero.

However, as illustrated in FIG. 6 and FIG. 7, in the rotor core 123 used in the comparative example, although the phase of the reluctance torque and the phase of the magnet torque are substantially inverted, an amount of variation in magnet torque (ripple component) is large, so that, as a result as illustrated in FIG. 8B, there is a problem in that the combined torque ripple is large. In this way, in the rotor core 123 used in the comparative example, the cause of an increase in torque ripple is that, in the circumferential direction of the rotor core 23, the depth of the notch groove is not sufficiently secured in the range closer to the center side (on the d-axis D) of the salient pole portion 11 than the virtual region IR obtained by projecting each of the air gap portions 14 and 15 toward the outer side in the radial direction of the rotor core 23, so that, when the magnetic poles are switched at the time of rotation of the rotor core, as illustrated in FIG. 5-1B to FIG. 5-4B, a distribution of the magnetic flux density starts to switch earlier at an electrode spacing portion, and thus, a range of vibration in magnetic flux is increased, and, as a result, the magnitude of the torque ripple of the magnet torque is increased. In contrast, in the rotor core 23 according to the embodiment, the notch minimum outside diameter portion 29S, in which the distance R2 from the rotation center O of the rotor core 23 to the notch grooves 16 and 17 is the minimum, is formed at the position closer to the center side (on the d-axis D side) of the salient pole portion 11 in the circumferential direction of the rotor core 23 than the virtual region IR that corresponds to a region obtained by extending each of the air gap portions 14 and 15 to an outer side in the radial direction of the rotor core 23 (in other words, the notch minimum outside diameter portion 29S is formed at the position closer to the center side of the salient pole portion 11 than the air gap portions 14 and 15 in the circumferential direction of the rotor core 23), so that the air gap between the rotor core 23 and the stator core 24 is appropriately secured at the time of rotation of the rotor 21. In this way, when the magnetic poles are switched at the time of rotation of the rotor core 23 due to the notch grooves 16 and 17, the air gap at the electrode spacing portion gradually expands, so that a variation in magnetic flux density distribution is suppressed by gradually decreasing the magnetic flux density as compared to the magnitude of the air gap. As a result, in the rotor core 23 according to the embodiment, although a variation in reluctance torque is slightly increased, a variation in magnet torque is sufficiently reduced, and thus, it is possible to suppress a torque ripple.

Figure 9:
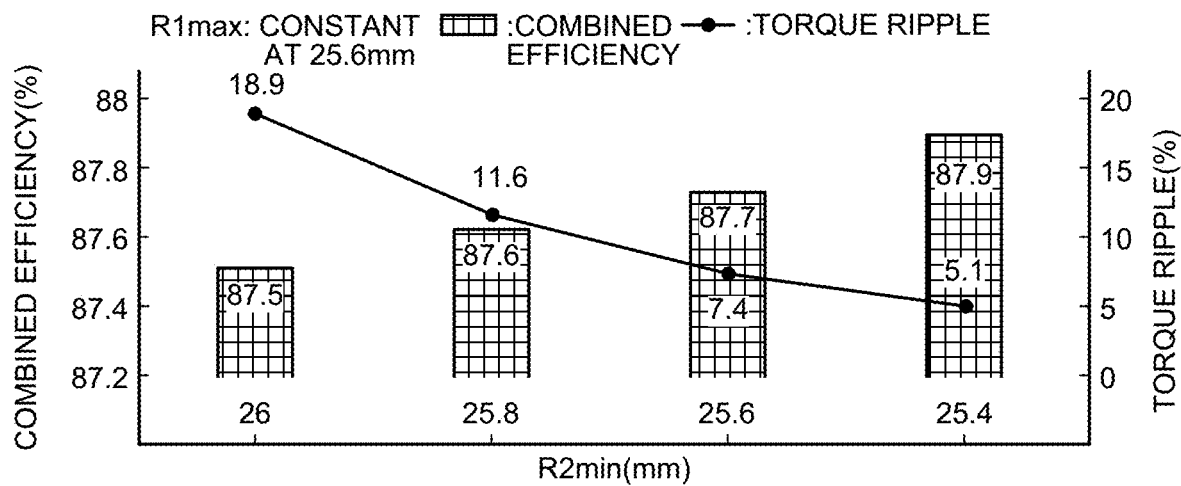
FIG. 9 is a graph illustrating, regarding the rotor core according to the embodiment, a relationship among a set of combined efficiency and a torque ripple, a distance of an air gap maximum outside diameter portion, and a distance of a notch minimum outside diameter portion.

Relationship Between Distance of Air Gap Maximum Outside Diameter Portion and Distance of Notch Minimum Outside Diameter Portion FIG. 9 is a graph illustrating a relationship among a set of combined efficiency and a torque ripple, the distance R1max from the rotation center O to the air gap maximum outside diameter portion 29L, and the distance R2min from the rotation center O to the notch minimum outside diameter portion 29S in the rotor core 23 according to the embodiment. In FIG. 9, the vertical axis indicates combined efficiency (ratio of an output mechanical energy (power) to an electricity energy (electrical power) that is input to the electric motor 6) (%) of the electric motor 6 and a torque ripple (%), whereas the horizontal axis indicates the distance R2min of the rotor core 23 from the rotation center O to the notch minimum outside diameter portion 29S (see FIG. 4). Furthermore, in FIG. 9, a condition for outputting a torque of 1.8 (Nm) is created by defining the distance R1max from the rotation center O of the rotor core 23 to the air gap maximum outside diameter portion 29L to be constant at 25.6 (mm), a rotation rate of the electric motor 6 to be 17 (rps). Here, a torque ripple (%) is defined by "a ratio of an amount of a variation in torque (a difference between the maximum value and the minimum value of a torque) to an average output torque". In this case, "torque ripple (%)=torque ripple TA (Nm)/1.8 (Nm)×100 in the rotor core 23 according to the embodiment".

As illustrated in FIG. 9, by setting the distance R2min from the rotation center O to the notch minimum outside diameter portion 29S to a value smaller than or equal to 25.6 (mm) corresponding to the distance R1max from the rotation center O to the air gap maximum outside diameter portion 29L, that is, by satisfying Equation (1), it is possible to suppress a reduction in combined efficiency of the electric motor 6, and it is also possible to suppress the torque ripple (%) at the time of rotation of the rotor core 23 to 10% or below.

Reference Example

Figure 10:
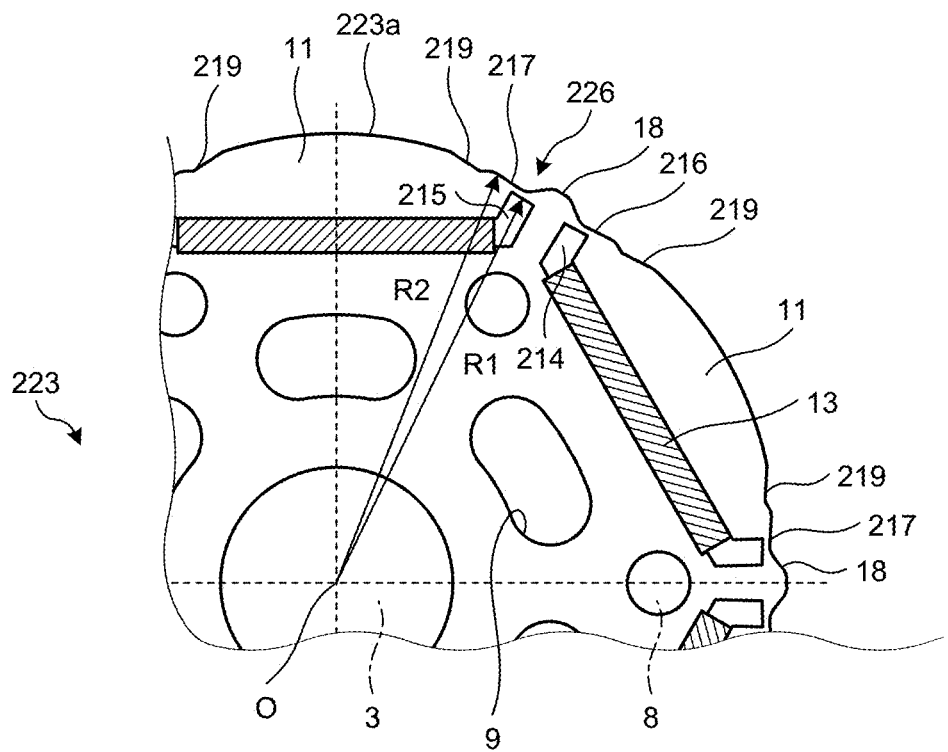
FIG. 10 is a plan view illustrating a shape of the rotor core used in a reference example.

In the following, a rotor that is used in a reference example and in which a notch groove is formed on an outer peripheral surface of a rotor core, will be described. In the reference example, by assigning the same reference numerals used in the embodiment to the same components included in the rotor core 23 according to the embodiment, and descriptions thereof will be omitted. FIG. 10 is a plan view illustrating the shape of the rotor core in the reference example.

As illustrated in FIG. 10, in a rotor core 223 in the reference example, at a position corresponding to the outer side in the radial direction of the rotor core 223, first notch grooves 216 and 217 are formed such that an outer peripheral surface 223a is notched with respect to air gap portions 214 and 215, respectively. In the rotor core 223, the first notch grooves 216 and 217 are formed on the outer side of a bridge portion 226. Furthermore, in the rotor core 223, in the circumferential direction of the rotor core 223, a second notch groove 219 is formed by being adjacent on the salient pole portion 11 side of the first notch grooves 216 and 217.

The rotor core 223 in the reference example includes the first notch grooves 216 and 217, and the second notch groove 219; however, in the radial direction of the rotor core 223, the distance R2min from the rotation center O of the notch minimum outside diameter portion in the first notch grooves 216 and 217 that are closer to the air gap portions 214 and 215, respectively, is larger than the distance R1max from the rotation center O of the air gap maximum outside diameter portion in the air gap portions 214 and 215. In other words, the rotor core 223 in the reference example has a configuration of R1max<R2min. As a result, unlike the embodiment, a magnet torque is not sufficiently reduced as compared to the configuration of R1max≥R2min, and thus, it is not possible to appropriately suppress a torque ripple.

Effects of Embodiment

In the rotor core 23 included in the electric motor 6 according to the embodiment, the notch grooves 16 and 17 are structured such that, on the plane perpendicular to the shaft 3 of the rotor core 23, the notch minimum outside diameter portion 29S, in which the distance from the rotation center O of the rotor core 23 to the notch grooves 16 and 17 is the minimum, is formed, and the notch minimum outside diameter portion 29S is formed at a position closer to the center side (on the d-axis D side) of the salient pole portion 11 than the air gap portions 14 and 15 in the circumferential direction of the rotor core 23. As a result of disposing the notch grooves 16 and 17 structured in this way, an air gap is appropriately secured at the time of rotation of the rotor core 23, and it is thus possible to suppress a variation in magnetic flux density distribution in association with rotation of the rotor core 23. As a result, according to the embodiment, it is possible to suppress an amount of variation in magnet torque, and it is thus possible to suppress a torque ripple. Furthermore, as a result of disposing the notch grooves 16 and 17 structured in this way, it is possible to locate the notch minimum outside diameter portion 29S of each of the notch grooves 16 and 17 at a position on the inner side in the radial direction of the rotor core 23 than the air gap maximum outside diameter portion 29L of each of the air gap portions 14 and 15, so that it is possible to further reduce the torque ripple.

Furthermore, in the rotor core 23 included in the electric motor 6 according to the embodiment, the relationship of R1max≥R2min represented in Equation (1) is satisfied, where R1max denotes the distance from the rotation center O of the rotor core 23 to the air gap maximum outside diameter portion 29L, and R2min denotes the distance from the rotation center O to the notch minimum outside diameter portion 29S. As a result, it is possible to improve the combined efficiency of the electric motor 6, and it is also possible to further suppress a torque ripple at the time of rotation of the rotor core 23.

Furthermore, in the rotor core 23 included in the electric motor 6 according to the embodiment, the bridge portion 26 includes the first bridge 27 that extends in the circumferential direction of the rotor core 23, and the second bridge 28 that is bent from one end of the center side (on the d-axis D side) of the salient pole portion 11 in the first bridge 27 toward the inner side in the radial direction of the rotor core 23. As a result, this makes it possible to suppress a variation in magnetic flux density distribution in accordance with rotation of the rotor core 23, and it is thus possible to suppress an amount of variation in a magnet torque and suppress a torque ripple.

Furthermore, in the rotor core 23 included in the electric motor 6 according to the embodiment, in the bridge portion 26, the width W of the direction of short side of the bridge portion 26 becomes the minimum in the vicinity of the boundary between the first bridge 27 and the second bridge 28. As a result, it is possible to suppress a variation in magnetic flux density distribution in accordance with rotation of the rotor core 23, and it is thus possible to suppress an amount of variation in magnet torque and suppress a torque ripple.

Furthermore, in the rotor core 23 included in the electric motor 6 according to the embodiment, in the bridge portion 26, the relationship of L1>L2 represented in Equation (2) is satisfied, where L1 denotes the length in the circumferential direction of the first bridge 27, whereas L2 denotes the length in the radial direction of the second bridge 28. As a result, this makes it possible to suppress a variation in magnetic flux density distribution in accordance with rotation of the rotor core 23, and it is thus possible to suppress an amount of a variation in magnet torque and suppress a torque ripple. Furthermore, it is possible to increase the combined efficiency of the electric motor 6 by reducing the leakage magnetic flux from the bridge portion 26 included in the rotor core 23.

Furthermore, on the outer peripheral surface 23a of the rotor core 23 included in the electric motor 6 according to the embodiment, the projection portion 18, which projects to the outer side in the radial direction of the rotor core 23, is provided at the electrode spacing portion located between the air gap portions 14 and 15, which are adjacent with each other in the circumferential direction of the rotor core 23. As a result, it is possible to reduce a harmonic component of an inductive voltage generated by the permanent magnet 13, and it is thus possible to reduce a cogging torque by approaching the inductive voltage waveform to a sine wave.

REFERENCE NUMERALS LIST 3 shaft (rotation axis)
6 electric motor
11 (11a to 11f) salient pole portion
12 (12a to 12f) magnet embedding hole
13 (13a to 13f) permanent magnet
14 (14a to 14f), 15 (15a to 15f) air gap portion
16 (16a to 16f), 17 (17a to 17f) notch groove
18 (18a to 18f) projection portion
19 groove
21 rotor (rotor)
22 stator (stator)
23 rotor core
23a outer peripheral surface
26 bridge portion
27 first bridge
28 second bridge
29S notch minimum outside diameter portion
29L air gap maximum outside diameter portion
D d axis
L1 length in the circumferential direction
L2 length in the radial direction
O rotation center
IR virtual region
R1 distance from rotation center O to inner surface of air gap portions 14 and 15
R2 distance from rotation center O to the notch grooves 16 and 17
R1max distance from rotation center O to air gap maximum outside diameter portion 29L
R2min distance from rotation center O to notch minimum outside diameter portion 29S
W width of bridge portion 26

The invention claimed is:

1. A rotor comprising a rotor core that is formed in a cylindrical shape, wherein
the rotor core includes
a plurality of magnet embedding holes that are formed along a direction perpendicular to a radial direction of the rotor core and disposed at intervals in a circumferential direction of the rotor core, each of which having a permanent magnet formed in a plate shape embedded therein,
a salient pole portion that is formed on an outer side of the permanent magnet in a radial direction of the rotor core,
an air gap portion that extends from both end sides of the permanent magnet in the circumferential direction toward an outer peripheral surface of the rotor core,
a notch groove that is formed such that a part of the outer peripheral surface is notched, and
a bridge portion that is formed between the outer peripheral surface and the air gap portion,
the notch groove is disposed such that the bridge portion is sandwiched between the notch groove and the air gap portion, and, as a result of a distance from a rotation center of the rotor core to the notch groove being changed along the circumferential direction on a plane perpendicular to a rotation axis of the rotor core, a notch minimum outside diameter portion, in which the distance from the rotation center is the minimum, is formed at the notch groove,
the air gap portion has an inner surface along the bridge portion and a corner formed at one end of the inner surface on the plane, the air gap portion being formed such that: a line extending towards the air gap portion along an outer surface of the magnet embedding holes located outward in the radial direction of the rotor core passes through the inner surface; and the corner is located radially outward from the line, and
the notch minimum outside diameter portion is located at a position closer to a center side of the salient pole portion than the air gap portion in the circumferential direction.

2. The rotor according to claim 1, wherein
the air gap portion includes an air gap maximum outside diameter portion, in which a distance from the rotation center of the rotor core is the maximum on an inner surface of the air gap portion on the plane, and
the air gap portion and the notch groove facing the magnet embedding hole that is continuous with the air gap portion satisfy R1max≥R2min, where R1max denotes a distance from the rotation center to the air gap maximum outside diameter portion, and R2min denotes a distance from the rotation center to the notch minimum outside diameter portion.

3. The rotor according to claim 2, wherein, in the bridge portion, a width in a short direction of the bridge portion is the minimum at a position of the air gap maximum outside diameter portion.

4. The rotor according to claim 1, wherein
the bridge portion includes
a first bridge that extends along the circumferential direction, and
a second bridge that is inclined from one end of the center side of the salient pole portion in the first bridge toward an inner side of the radial direction.

5. The rotor according to claim 4, wherein L1>L2 is satisfied in the bridge portion, where L1 denotes a length of the circumferential direction of the first bridge, and L2 denotes a length of the radial direction of the second bridge.

6. The rotor according to claim 1, further comprising a projection portion, which projects toward an outer side in the radial direction, is provided between the air gap portions that are adjacent with each other in the circumferential direction on the outer peripheral surface of the rotor core.

7. An electric motor comprising:
the rotor according to claim 1; and
a stator that is disposed on an outer peripheral side of the rotor.

* * * * *